United States Patent
Cook

(10) Patent No.: US 6,369,360 B1
(45) Date of Patent: Apr. 9, 2002

(54) COMBINATION HIGH SPEED INFRARED AND CONVECTION CONVEYOR OVEN AND METHOD OF USING

(75) Inventor: Edward R. Cook, Cedar Rapids, IA (US)

(73) Assignee: Maytag Corporation, Newton, IA (US)

( * ) Notice: Subject to any disclaimer, the term of this patent is extended or adjusted under 35 U.S.C. 154(b) by 0 days.

(21) Appl. No.: 09/574,290

(22) Filed: May 19, 2000

Related U.S. Application Data

(60) Provisional application No. 60/135,292, filed on May 21, 1999.

(51) Int. Cl.[7] .............................. A21B 1/48; A21B 1/22; A21B 1/26; A21B 1/02
(52) U.S. Cl. ........................ 219/388; 219/400; 219/405; 219/411; 99/443 C
(58) Field of Search ................................. 219/388, 400, 219/405, 411; 126/21 A; 99/443 C, 474, 476, 477, 386; 392/375, 376

(56) References Cited

U.S. PATENT DOCUMENTS

| | | | |
|---|---|---|---|
| 2,575,426 A | | 11/1951 | Parnell |
| 4,121,509 A | * | 10/1978 | Baker et al. .............. 99/443 C |
| 4,257,172 A | | 3/1981 | Townsend |
| 4,363,955 A | | 12/1982 | Gauthier et al. |
| 4,377,109 A | | 3/1983 | Brown et al. |
| 4,389,562 A | | 6/1983 | Chaudoir |
| 4,591,333 A | | 5/1986 | Henke |
| 4,781,169 A | * | 11/1988 | Henke et al. .............. 99/443 C |
| 4,951,648 A | * | 8/1990 | Shukla et al. .............. 99/443 C |
| 5,239,917 A | * | 8/1993 | Lutkie et al. .............. 99/443 C |
| 5,266,766 A | | 11/1993 | Hecox |
| 5,317,127 A | | 5/1994 | Brewster, Jr., et al. |
| 5,573,688 A | | 11/1996 | Chanasyk et al. |
| 5,721,805 A | | 2/1998 | Cook et al. |
| 5,747,775 A | * | 5/1998 | Tsukamoto et al. ......... 219/400 |
| 5,906,485 A | * | 5/1999 | Groff et al. ................. 432/121 |
| 6,069,344 A | * | 5/2000 | Krasznai et al. ............ 219/400 |
| 6,114,664 A | * | 9/2000 | Cook et al. ................. 219/400 |

FOREIGN PATENT DOCUMENTS

| | | | |
|---|---|---|---|
| GB | 2045593 | * | 11/1980 |
| JP | 06-125690 | * | 5/1994 |

\* cited by examiner

Primary Examiner—Joseph Pelham
(74) Attorney, Agent, or Firm—McKee, Voorhees & Sease, P.L.C.

(57) ABSTRACT

In a broad aspect, the invention is a conveyorized oven for heating food products comprising: a cavity having two continuous access openings; a convection heating source, the convection heating source including a heating element, a blower, and a plenum in communication with the cavity, the convection heating source providing heated air to the cavity; an upper radiant energy heating source in communication with the cavity, the upper radiant energy heating source including an infrared light source and at least one reflector providing radiant energy to the cavity; a lower radiant energy heating source in communication with the cavity, the lower radiant energy heating source providing radiant energy to the cavity; and a conveyor system for transporting food products through the first continuous access opening, the cavity, and the second continuous access opening at a rate of speed sufficient to allow the food products to be heated.

14 Claims, 8 Drawing Sheets

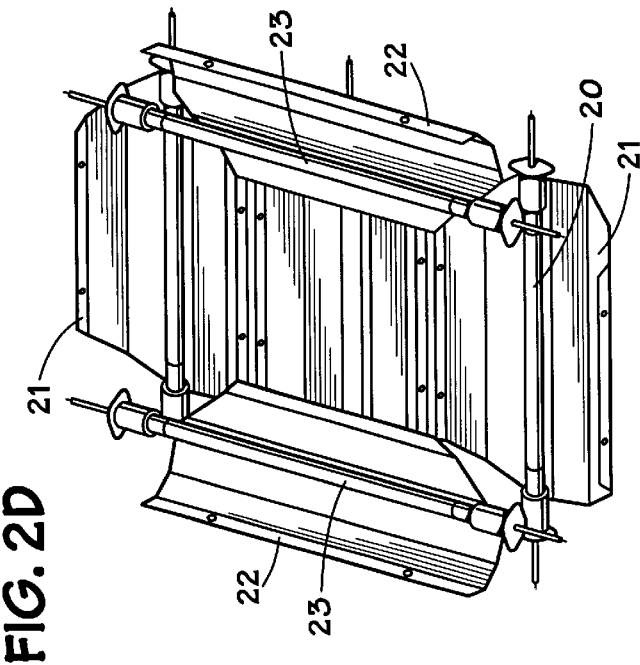
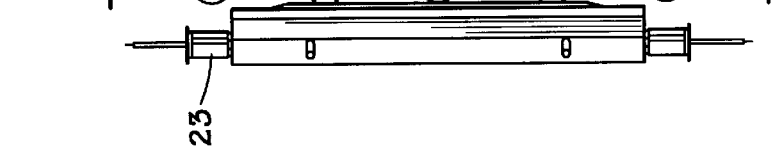
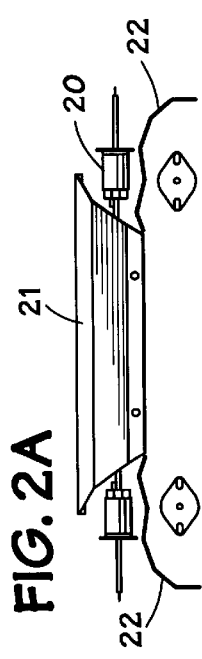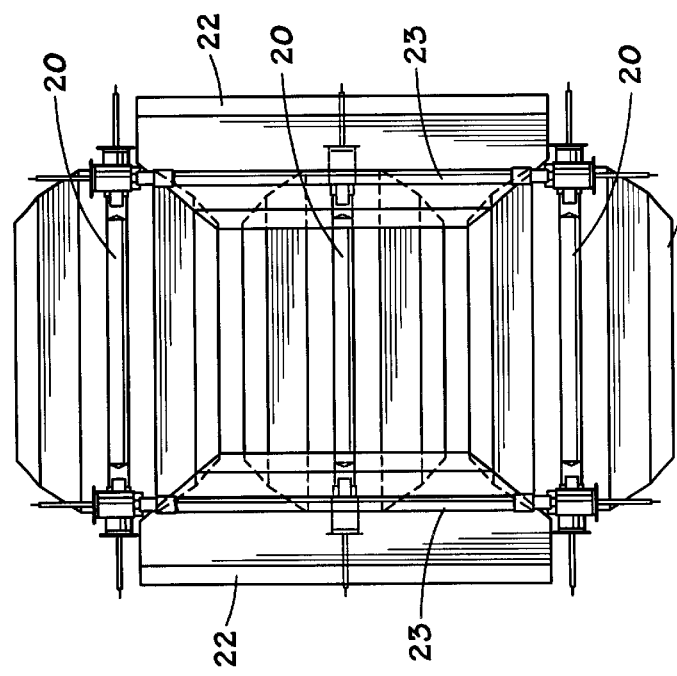

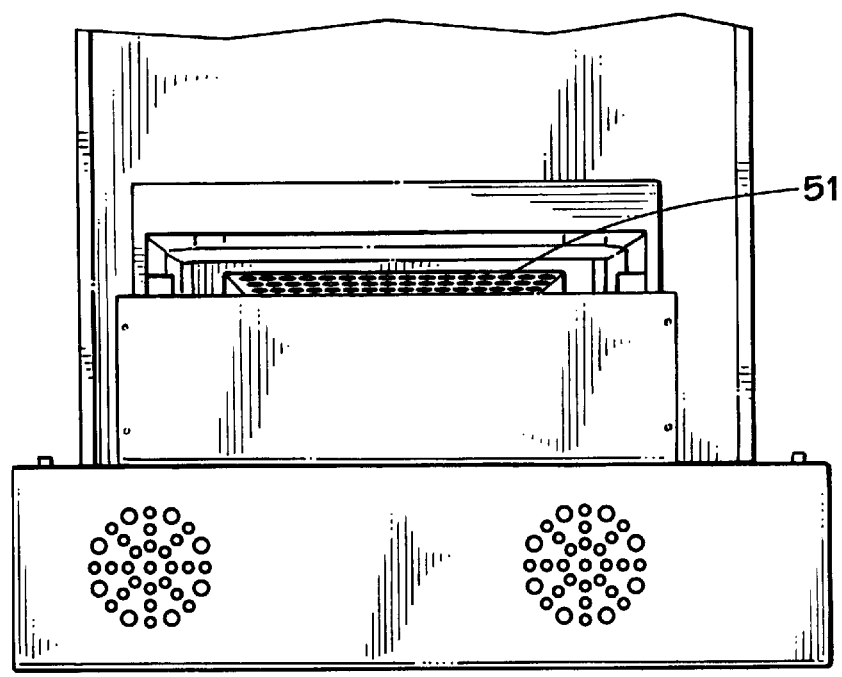
FIG. 9
FIG. 10
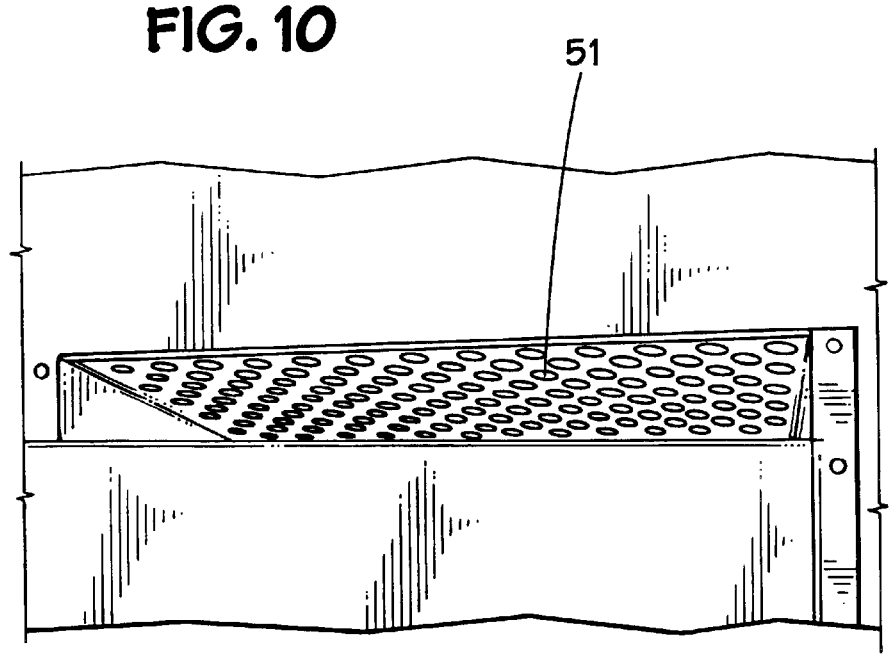

COMBINATION HIGH SPEED INFRARED AND CONVECTION CONVEYOR OVEN AND METHOD OF USING

RELATED APPLICATION

This application claims the benefit of U.S. Provisional Application No. 60/135,292, filed May 21, 1999.

BACKGROUND of the INVENTION

1. Field of the Invention

The present invention relates to commercial ovens, more specifically ovens which are used in commercial enterprises where rapid heating and browning are required.

2. Description of the Related Art

Traditional conveyor ovens, used to cook pizza and other similar product, rely on either high velocity hot air, high thermal mass heating elements (medium wave infrared) or thermal, natural convection technology, to process food. These ovens employ a conveyor that moves food through a heated cavity to facilitate continuous (assembly line type) cooking with minimum operator involvement. Most of the ovens also provide a door in the side of the cavity to load food for quick browning, thus, bypassing the conveyor.

While the referenced cooking technologies are effective at cooking a wide range of products they typically take between 6 and 12 minutes to cook a pizza, a food which represents the majority of the cooking applications. This time frame does not fit into a 'made to order' environment and requires the operator to cook a large number of product (pizza) and hold them to satisfy demand during peak periods. Many operators that already serve "fast food", i.e., hamburgers, would like to offer pizza on the menu, but due to the relatively long cook times and the subsequent need to hold the product, which degrades quality, they do not. What is needed is a high speed conveyor oven that can cook product (pizza) in less than 3 minutes, produces results similar to more traditional cooking methods and provides key features of traditional conveyor ovens. This would allow many operators to offer high quality "made to order" pizza, expanding sales and profits.

There are high speed ovens using high power density, low mass heaters, including the Amana Wave™ oven, that are capable of achieving pizza cook times of 3 minutes or less, however, they are either not conveyorized and/or require the application of a turntable within the cooking environment to achieve cooking uniformity. They also do not typically brown food, for example, the sides of a pizza crust being cooked in the oven because the direction of energy directed toward the pizza is perpendicular to the cooking surface. These constraints restrict their acceptance as a high speed alternative to traditional conveyor ovens.

There have been attempts to seek to augment traditional and well known conveyor ovens by increasing the operating temperature and/or velocity of the heated air to accelerate cooking. This has the effect of producing faster browning of the cheese but the central sections of the food remain under-cooked or under-heated.

Still other attempts involve combining microwave and hot air convection in a single non-conveyor cavity. While this accelerates cooking times it tends to have a negative effect on dough quality and still restricts the operator to 'batch' type, or "one-at-a-time" cooking.

The novel aspect of the present invention is the combined application of convection and radiant heating technology that has not been applied to conveyor ovens previously. Moreover, the use of a specifically configured arrangement of halogen lamps and formed reflectors, with the capability of illuminating the area described, is presently not available, with the exception to one described in U.S. Pat. No. 5,721,805.

The combination and unique design/application of these technologies provides an oven that can cook a high profit margin food product (pizza for example) in a time frame that provides operators a 'make to order' product instead of cooking and holding. This benefit should provide increased market penetration and new avenues of profit for restaurant owners and operators.

SUMMARY OF THE INVENTION

The Combination High Speed Infrared and Convection Conveyor Oven of the present invention overcomes the problems of the prior art, and meets the above described needs. The invention described utilizes the combination of two types of heat transfer technology, convection and radiation, operating in unison within a single cavity and employing a conveyor to move food through a series of heat zones. Stage 1 heat zone is predominantly convection. Stage 2 heat zone is a combination of convection and short to mid wave infrared (IR). The shorter wavelength IR is emitted from a specifically configured arrangement of quartz halogen lamps and reflectors, referred to as the 'Upper Radiant Heating Element'.

BRIEF DESCRIPTION OF THE DRAWINGS

Other features and advantages of the present invention will become more fully apparent from the following detailed description, appended claims, and the accompanying drawings in which:

FIG. 2—depicts an upward perspective of the lower side of an upper radiant heating element sub-assembly of the High Speed Infrared and Convection Oven of the present invention.

FIG. 9—is an output end view of the present invention fully assembled, depicting a location of hot air orifices.

FIG. 10—is an close-up partial output end view of the present invention, depicting a location of hot air orifices.

While the invention will be described in connection with the preferred embodiments, it will be understood that it is

DETAILED DESCRIPTION OF THE PREFERRED EMBODIMENTS

The Combination High Speed Infrared and Convection Conveyor Oven of the present invention hereinafter described utilizes the combination of two types of heat transfer technology: convection and radiation; operating in unison within a single cavity and employing a conveyor to move food through a series of heat zones. Stage 1 heat zone is predominantly convection. Stage 2 heat zone is a combination of convection and short to mid wave infrared (IR). The shorter wavelength IR is emitted form a specifically configured arrangement of quartz halogen lamps and reflectors, referred to as the 'Upper Radiant Heating Element'.

Figure 1:
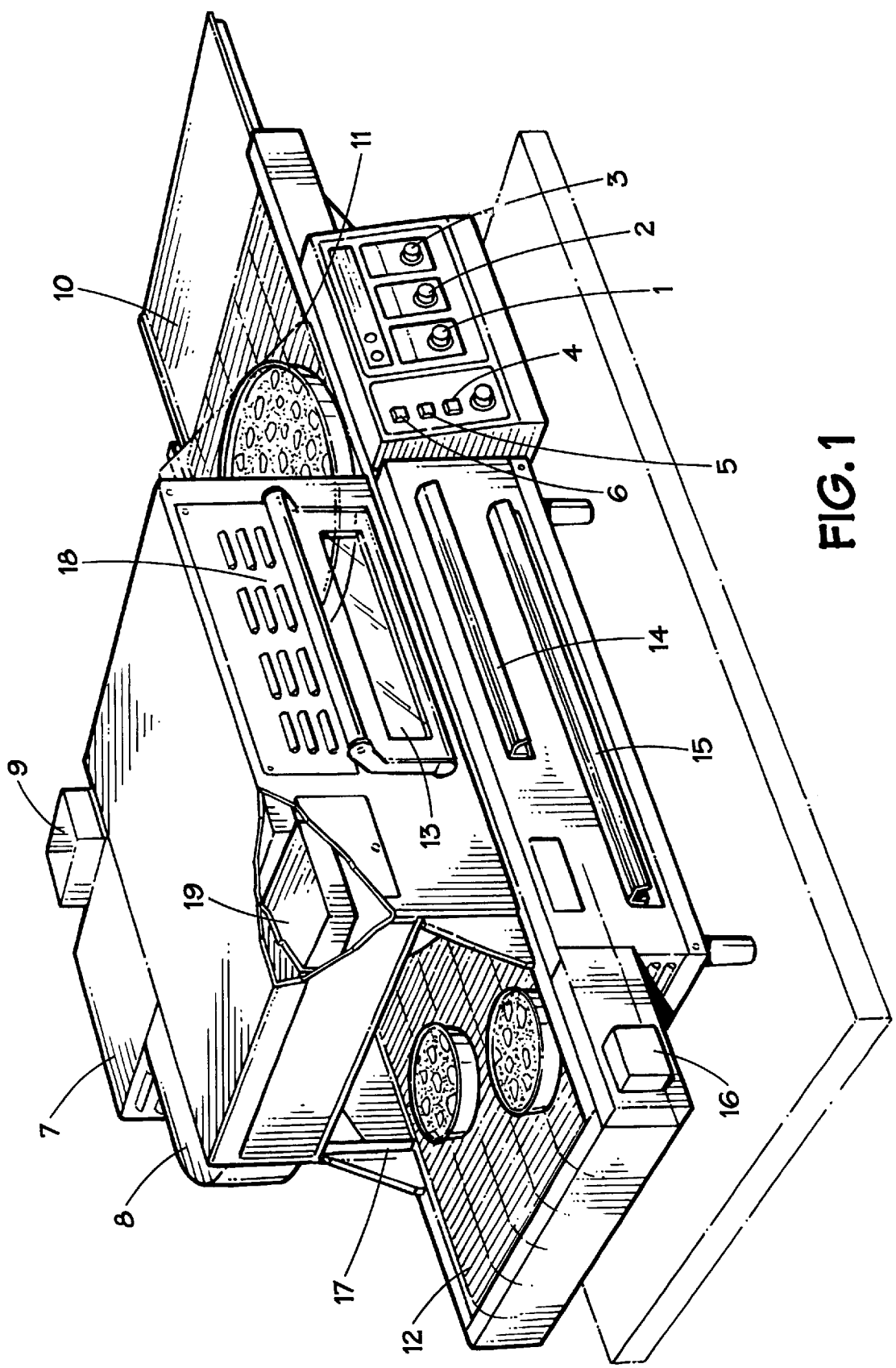
FIG. 1—is a general arrangement isometric view of the High Speed Infrared and Convection Oven of the present invention shown in operation.

Referring now to FIG. 1, the following are descriptions of major components, and locations thereof in a general assembled arrangement.

(1) Master Control -Upper Halogen Lamp Array wherein Power is adjustable from 0%–100%, in 10% increments, an Icon above control knobs illustrate lamp configuration, and LED's beneath the lamp icons indicate individual lamp, indicate operation are used primarily as a service aid in the event of a lamp failure.

(2) Master Control-Conveyor Speed—Infinitely variable conveyor speed in FPM.

(3) Master Control-Lower Ribbon—Power adjustable from 0%–100%, in 10% increments.

(4) Power, On/Off-Conveyor Motor.

(5) Power, On/Off-Convection Fan/Heater—RTD limits air temperature at plenum entrance to oven cavity at 550° F.

(6) Master System Power-On/Off.

(7) Convection/Cooling Blower/Motor—Draws air through upper lamp assembly for cooling purposes. Redirects partial air flow through heat exchanger where air is heated to 500° F. Heated air is directed into impingement plenum (8, 18), through exhaust ports and onto food surface.

(8) Plenum-Forced/Heated Convection Air.

(9) Exhaust Stack.

(10) Extension Tray.

(11) Upper Light Shield.
Clear, tempered Borosilicate 40 (8500 PSI). Removable
Protects and isolates lamp assembly components from cavity.

(12) SST Conveyor Belt-18' Wide.

(13) Batch Load Door Viewing Window.

(14) Lower Shield.
Robax™ clear ceramic glass. Removable.

(15) Crumb Tray-Removable.

(16) Conveyor Motor/Cover.

(17) Visible light shield—Metallic or high temperature plastic cover et entrance and exit to shield operator from intense visible and IR energy.

(18) Access panel-Upper Halogen Lamp Assembly.

(19) Forced convection delivery plenum.

In operation the cooking process occurs in two stages.

Referencing the configuration illustrated in FIG. 1, in Stage 1 the food (pizza for example) is placed on the conveyor belt (preferably nickel alloy wire mesh) at the front of the oven (indicated by arrow). The 'Motor-Conveyor' moves the conveyor belt and draws the food under a forced hot air convection zone. In this zone the top of the food surface is exposed to heated air, preferably 550° F. air, at an optimum flow rate for the size of the oven cavity, in this embodiment, approximately 110 CFM (cubic ft./min.), delivered from a 'Blower' and through a 'High Velocity Plenum'. This begins the cooking process by melting the cheese and driving moisture away form the surface of the dough; thus preparing the food for high power density cooking.

Further to the cooking process, and in stage 2, the partially cooked food enters an infrared zone where high intensity radiant energy impinges the top and bottom of the product, for example, pizza, or pizza pan for the lower heating element. The upper elements comprise a specifically configured array of quartz halogen lamps preferably operating at 2900K (color temp). The arrangement, which also includes formed back reflectors, uniformly illuminates a 15"×12"area with a power density up to 25 watts/in$^2$ At this power density rapid the finalization occurs at the surface and sub-surface of the food. This contributes to rapid browning of the cheese and crust. The uniform distribution of the energy, also allows food product to be loaded into the oven via a door located in the side of the cavity; providing the ability to quickly top brown and/or rethermalize product without using the conveyor.

The lower element comprises a of a length of thin nickel chromium ribbon of specific configuration and impregnated in an insulating material. The lower element preferably operates at 1400K (color temperature) and lower power density. This element is commercially available and is manufactured by Ceramaspeed™. Note: The reduced power density on the lower elements is acceptable because generally it will illuminate and heat a dark anodized aluminum (pizza) pan or otherwise high emissivity material. In addition to radiant energy in this section, overall browning to the sides of the food product is enhanced, by hot air, preferably about 450° F. turbulent air exiting from the 'High Velocity Plenum' and drawn through the cavity by the centrifugal 'Blower Motor'.

Figure 3:
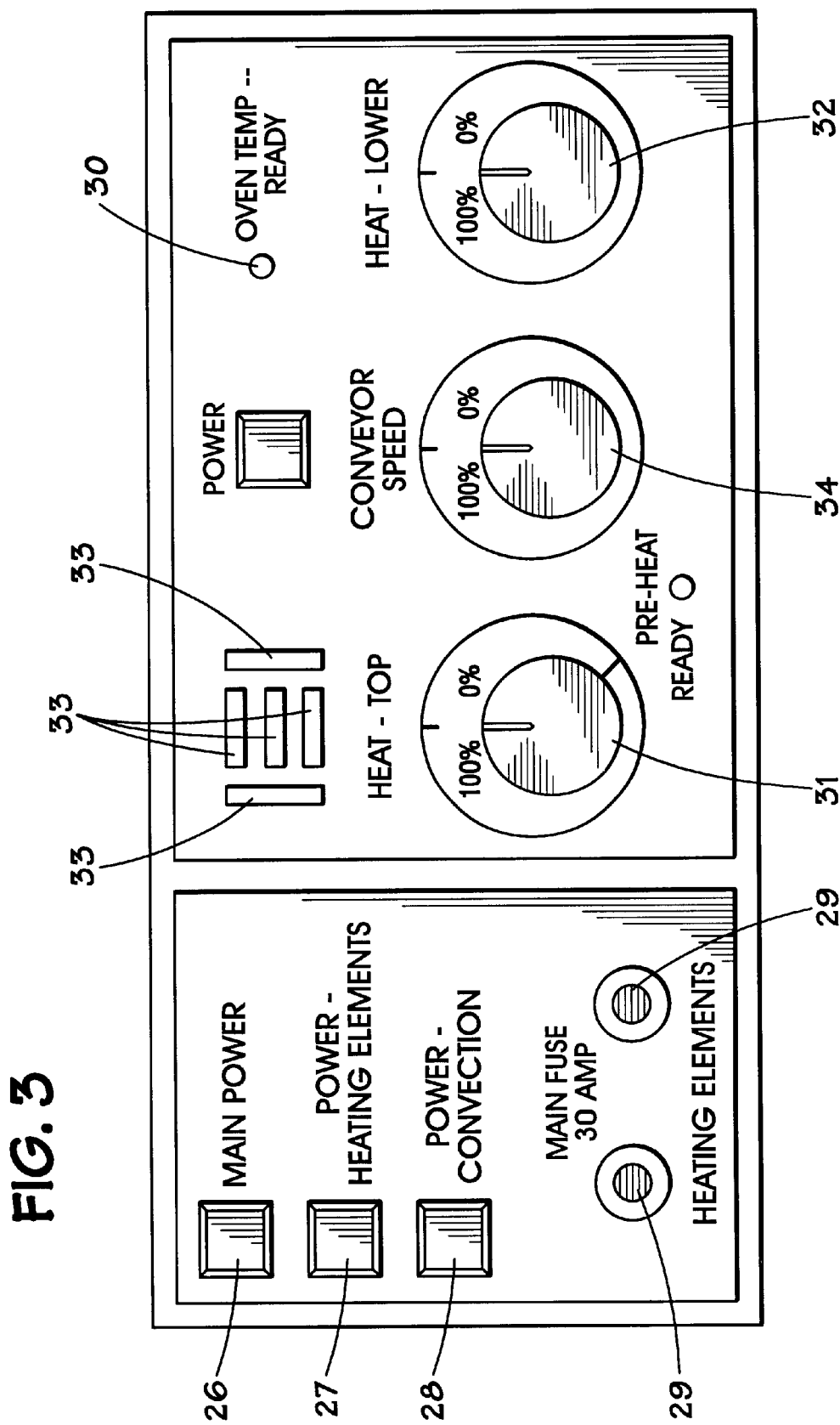
FIG. 3—is a layout of the major control functions and a panel layout of the High Speed Infrared and Convection Oven of the present invention.

Referring now to FIG. 2, illustrated is an upward perspective of the lower side of an upper radiant heating element sub-assembly of the High Speed Infrared and Convection Oven of the present invention and shows lamp and reflector geometry. In this embodiment five Quartz Halogen Lamps are shown which produce up to 6 Kw of evenly distributed infrared energy on a cooking plane of approximately 15 inches by 12 inches. The upper radiant heating element subassembly is located in the cooking cavity just above the conveyor belt. Wattage and size of cooking plane may be varied as needed to accommodate the type of food being cooked without 5 limitation of the scope of the invention., The following identifiers correspond to the figure:

(20) Transverse Halogen lamp
(23) Top Reflector
(24) Side Reflector
(25) Axial Cooking Lamp
Referring now to FIG. 3, General Control Functionality, major control functions and a panel layout of the High Speed Infrared and Convection Oven of the present invention are shown.

(26) The 'Main Power' button provides standby power to the main pilot relay.

(27) The 'Power-Heating Elements' button provides voltage to each of the 3 individual heating relays (Top, Lower & Convection). These circuits are fused (29) for overload protection.

(28) The 'Power—Convection' button turns on the blower and convection heating element located within the "High velocity Plenum'. Note: If only the radiant elements are in use, the blower will turn on automatically. The convection is only activated when the 'Power-Convection' button is depressed. An oven RED provides the control with information about the oven temperature. The control incorporates a PID algorithm to automatically regulate oven cavity temperature between 430° F.–4600 F.

(30) The 'Oven Temp Ready' LED indicates when the pre-set temperature is achieved. Heating element intensity for the upper (31) and lower (32) radiant heaters can be regulated from 0%–100% via the front panel knobs. The halogen heating elements will be phase fired when powered up from a cold or de-energized state to reduce damaging in-rush currents. The heating element grouped into 3 separate control circuit energized by a single track for each circuit.

(33) Individual halogen elements, 5 in this embodiment, are graphically depicted by 5 LED's above the 'Heat—Top' knob (item 33 in FIG. 2). Should a lamp burn out, the corresponding LED will not be illuminated.

(34) The conveyor motor speed is controlled via the front panel knob and can be switched on or off by depressing the button above the 'Conveyor Speed' knob.

Figure 4:
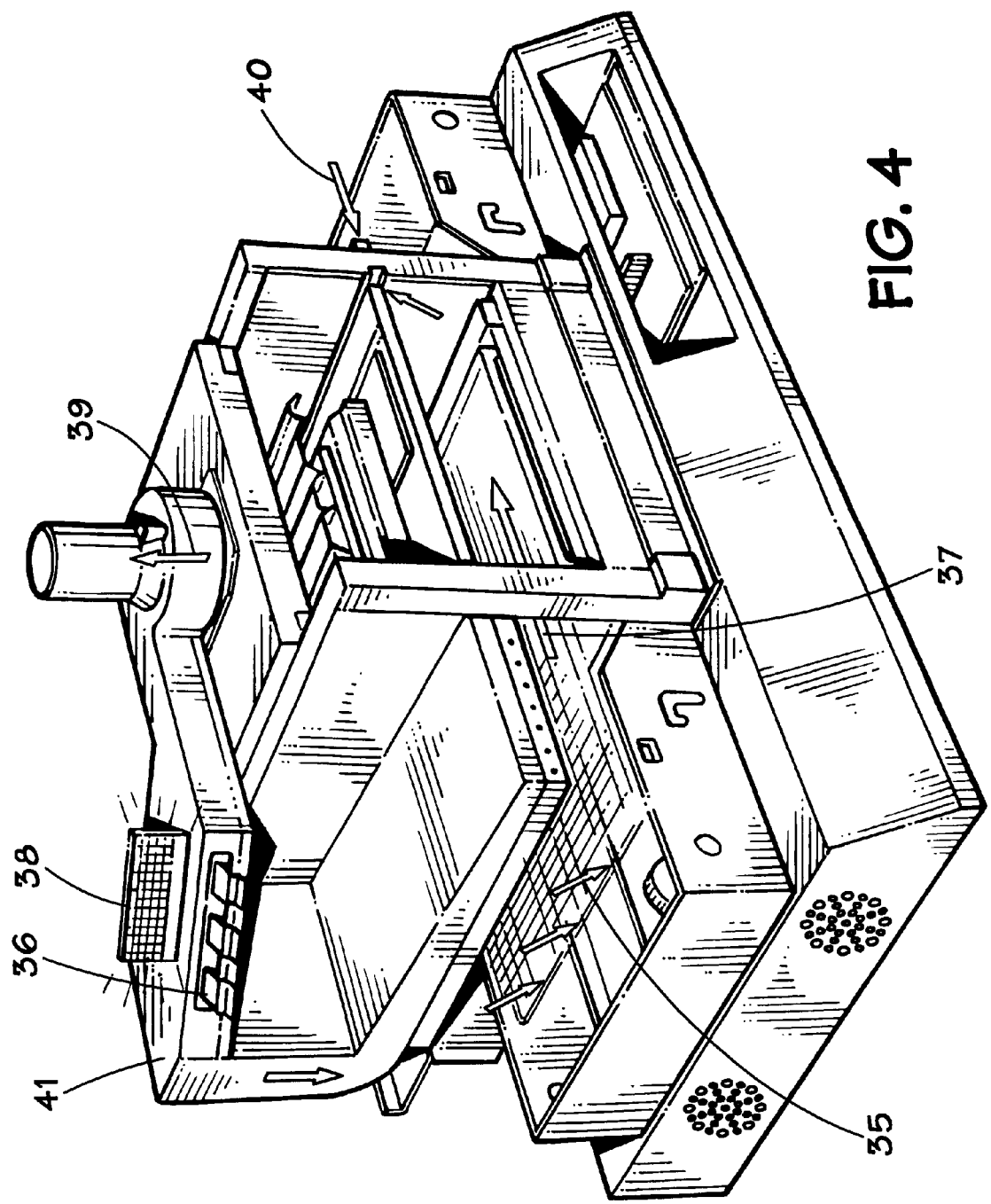
FIG. 4—is a partial cutaway view of the High Speed Infrared and Convection Oven of the present invention depicting a variable direction air flow feature.

Referring now to FIG. 4, illustrated is a partial cutaway view of the High Speed Infrared and Convection Oven of the present invention depicting a recuperative thermal system, and is schematically shown by enumerated arrows.

Heated air output (35) is directed onto the product to be cooked. This heated air (36) is drawn into and through the cavity, and is mixed with cool air (40) where it becomes semi-heated air (39). The air is then directed into a plenum (41) where it is exposed to convection boost heaters (36), where it the air is re-heated at location (38), and re-directed downward onto the product to be cooked, and the air circulation process is repeated. This has the effect of recuperating heat that is normally exhausted and lost. Further, the system is balanced so enough ambient air enters the system to keep critical components from overheating, and simultaneously provides uniform and homogenous temperatures in the cooking cavity.

Figure 5:
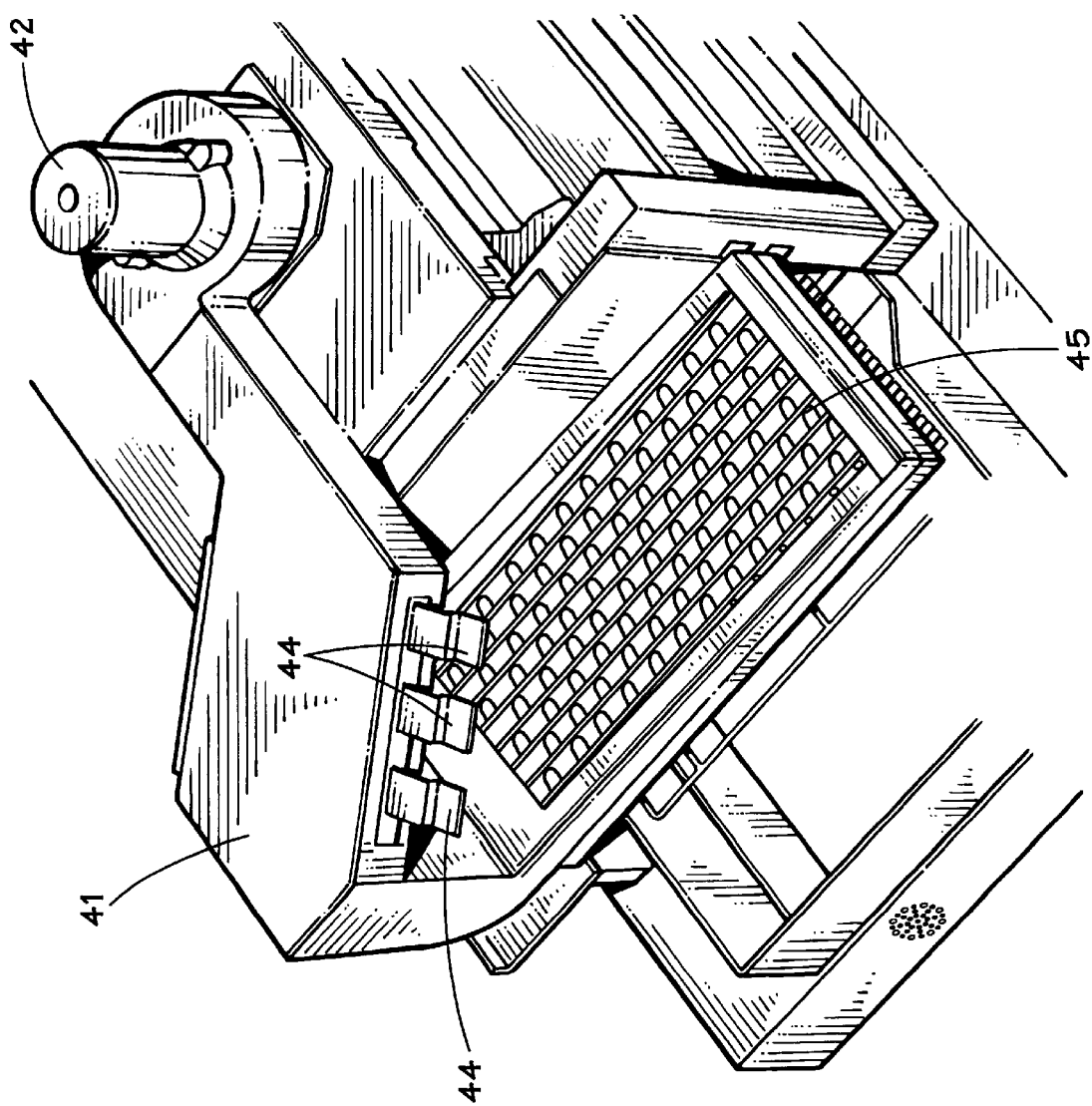
FIG. 5—is a partial isometric view of a portion of the variable direction air flow feature further illustrating a means of heating and controlling air volume and velocity in the present invention.

Referring now to FIG. 5—shows additional detail of the variable directional air flow system of the present invention, wherein serni-heated air (39) is directed into the plenum (41) by the blower motor assembly (42) and boost heated by the convection boost heaters (36) to a temperature suitable for the food being cooked, preferably 550 deg F. The heated air is then directed toward the oven cavity and food product by the angular position of an orifice cylinder array (45) which comprises a plurality of variable orifices. Changing position of the cylinders affects the heat transfer characteristics of the air from an impinging effect to a shearing effect, and can in this way be altered for varying food types to be cooked.

Figure 6:
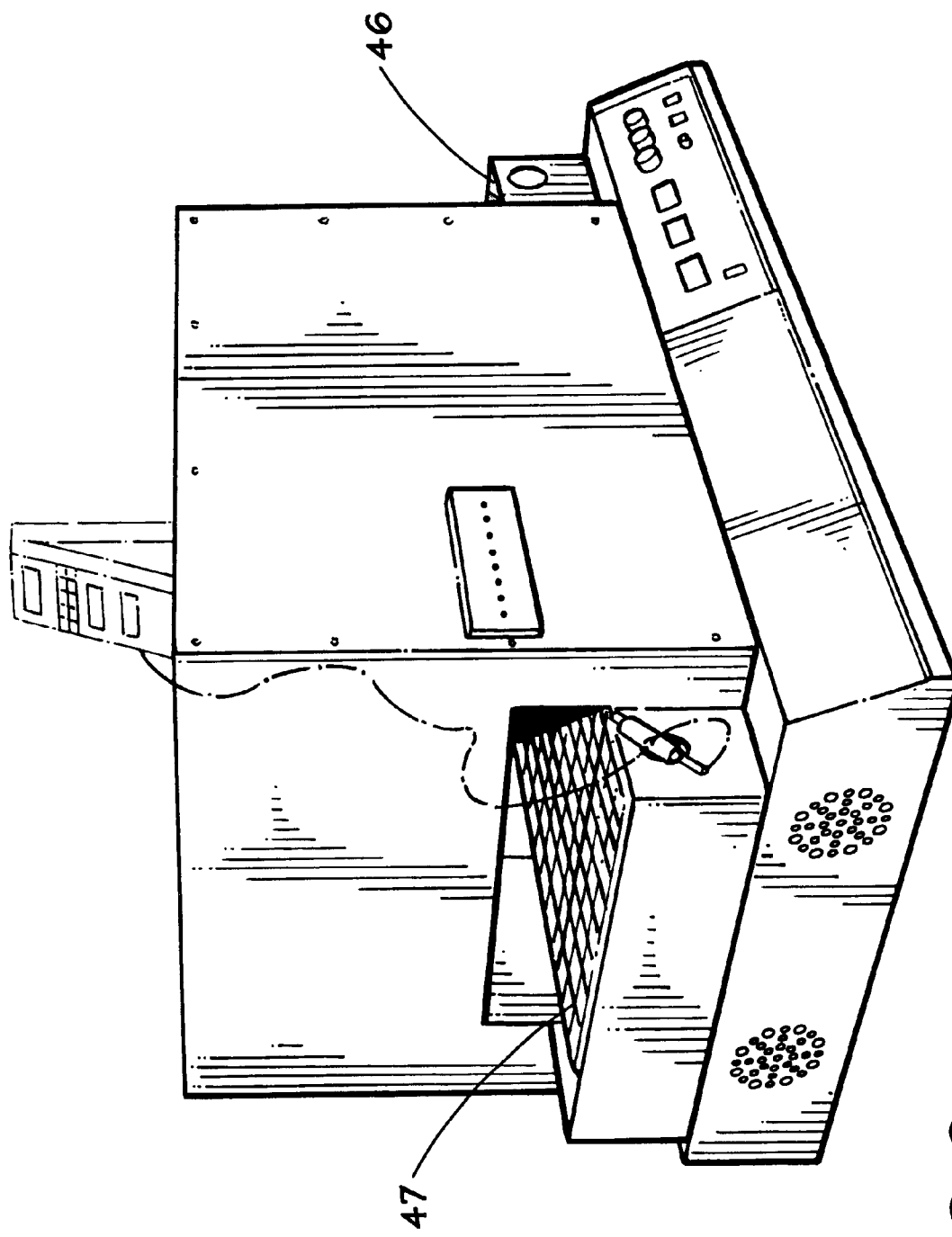
FIG. 6—is a fully assembled High Speed Infrared and Convection Oven of the present invention illustrating input and output access openings.

Referring now to FIG. 6—is a fully assembled High Speed Infrared and Convection Oven of the present invention illustrating input (47) and output (48) access openings.

Figure 7:
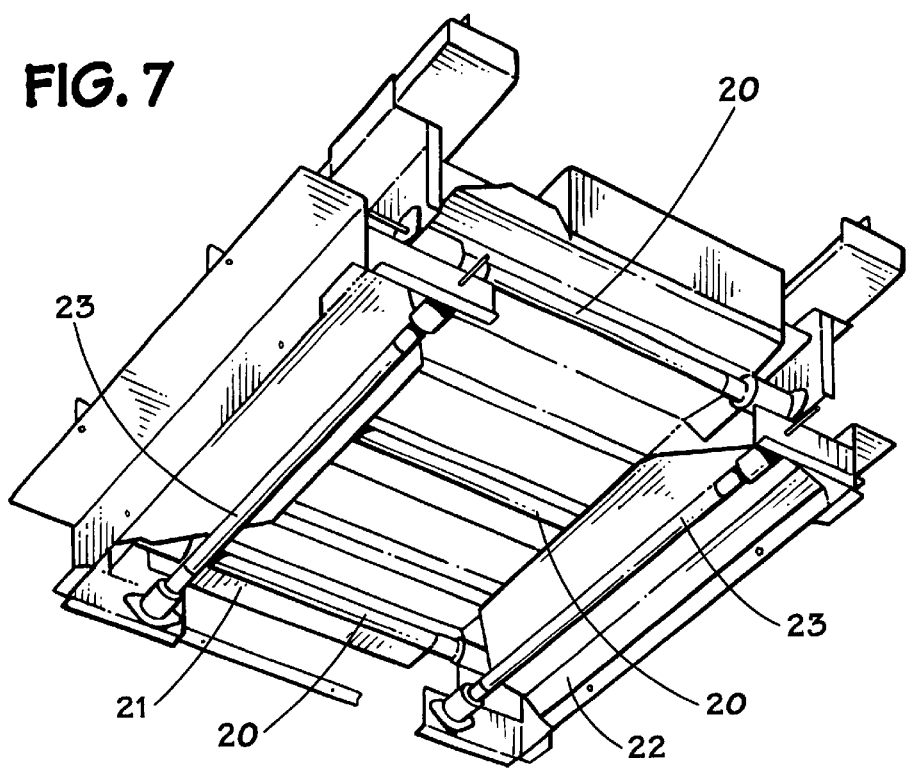
FIG. 7—depicts an upward perspective of the lower side of an alternate embodiment of the upper radiant heating element sub-assembly of the present invention.

In FIG. 7, an upward perspective of the lower side of an alternate embodiment of the upper radiant heating element sub-assembly of the present invention is illustrated. This arrangement provides uniform radiant energy to the product being cooked. The three (20) transverse halogen lamps have energy emitted therefrom directed downward by the top reflector (23). The two axial cooking lamps (25) have energy emitted therefrom directed downward by the side reflector (24).

Figure 8:
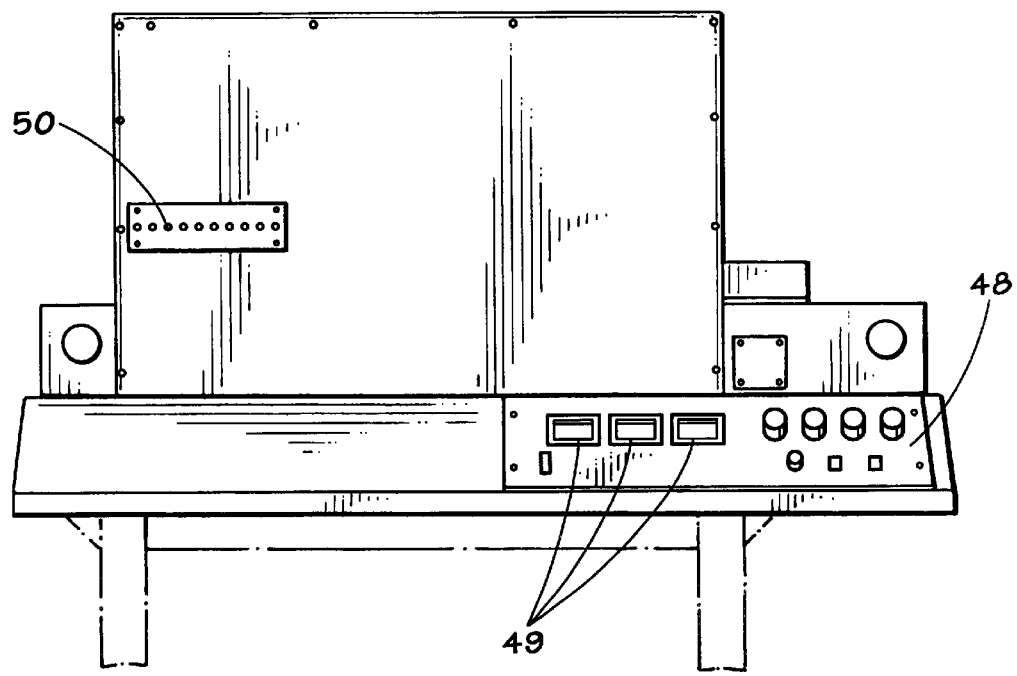
FIG. 8—is a front view of the present invention fully assembled, showing control functions.

FIG. 8 is a front view of the High Speed Infrared and Convection Oven the present invention fully assembled, showing a control panel embodiment (48) comprising temperature indicators (49) and system controls. Also shown are a plurality of hot air directional control knobs (50).

Referring to FIG. 9 is an output end view of the present invention fully assembled, depicting a location of hot air orifices (51).

FIG. 10 is an close-up partial isometric view of the output end of present invention, depicting a location of hot air orifices (51).

This invention solves the problem of process time vs. quality product delivery. In general it reduces process time by 50% while still producing a quality product and in a configuration that is appealing to most operators. While the dominant processing method is through radiant heat transfer the addition of convection aids in the uniform browning of food surfaces not in direct 'line of sight' to the radiant energy. In some cases where convection heating is not required there is no need to pre-heat the oven due to the fast response time of the radiant elements.

Whereas the present invention is not limited to the exact details of construction, operation, exact materials or embodiments shown and described, as obvious modifications and equivalents will be apparent to one skilled in the art. Whereas, the present invention has also been described in relation to the drawings attached hereto, it should be understood that other and further modifications, apart from those shown or suggested herein, may be made within the scope and spirit of the present invention.

What is claimed is:

1. A conveyorized oven for heating food products comprising:

a cavity having a first continuous access opening and a second continuous access opening;

a convection heating source, the convection heating source including a heating element, a blower, and a plenum in communication with the cavity, the convection heating source providing heated air to the cavity;

an upper radiant energy heating source in communication with the cavity, the upper radiant energy heating source including an infrared light source and at least one reflector providing radiant energy to the cavity;

a lower radiant energy heating source in communication with the cavity, the lower radiant energy heating source providing radiant energy to the cavity; and a conveyor system for transporting food products through the first continuous access opening, the cavity, and the second continuous access opening at a rate of speed sufficient to allow the food products to be heated.

2. The conveyorized oven of claim 1, wherein the infrared light source includes at least one halogen lamp.

3. The conveyorized oven of claim 2, wherein the infrared light source includes a plurality of halogen lamps, each of the plurality of halogen lamps having a corresponding reflector.

4. The conveyorized oven of claim 3, wherein the lower radiant energy heating source includes a nickel chromium ribbon.

5. The conveyorized oven of claim 1, wherein the convection heating source is disposed adjacent the first access opening and the radiant energy heating source is disposed adjacent the second access opening.

6. The conveyorized oven of claim 5, wherein the conveyor system includes a conveyor belt driven by a conveyor motor.

7. The conveyorized oven of claim 6, wherein the upper radiant energy heating source is disposed above the conveyor belt thereby providing radiant energy in a downward direction.

8. The conveyorized oven of claim 7, wherein the convection heating source is disposed above the conveyor belt thereby providing convection heat in a downward direction.

9. The conveyorized oven of claim 8, wherein the lower radiant energy heating source is disposed below the conveyor belt thereby providing radiant heat in an upward direction.

10. A method for heating food products comprising the steps of:

providing a food product;

applying convection heat to the food product in a cavity for an amount of time sufficient to partially heat the food product, wherein the convection heat is provided to the cavity by a convection heat source, the convection heating source including a heating element, a blower, and a plenum in communication with the cavity; and applying radiant heat to the food product in the cavity for an amount of time sufficient to completely heat the food item, wherein the radiant heat is provided to the cavity by two radiant energy heating sources in communication with the cavity, one radiant energy heating source applying radiant heat in a downward direction and the other radiant energy heating source applying radiant heat in an upward direction.

11. The method of claim 10, wherein the convection heat is applied to the food product in a downward direction.

12. A method for heating food products comprising the steps of:

providing a food product;

providing a conveyorized oven, the conveyorized oven including a cavity having first and second continuous access openings, a convection heating source, an upper radiant energy heating source, a lower radiant energy heating source, and a conveyor belt and a conveyor motor for moving the conveyor belt through the first continuous access opening, the cavity, and the second continuous access opening;

transporting the food product on the conveyor belt through the first continuous access opening into the cavity;

applying only convection heat to the food product in the cavity, the convection heat provided to the cavity by a convection heat source in communication with the cavity;

applying radiant energy to the food product in the cavity, the radiant heat provided to the cavity by an upper radiant energy heating source and a lower radiant energy heating source in communication with the cavity; and transporting the food product on the conveyor belt through the second continuous access opening out of the cavity.

13. The method of claim 12, wherein the convection heat is applied to the food product in a downward direction.

14. The method of claim 12, wherein the radiant heat is applied to the food product by two radiant energy heating sources, one radiant energy heating source applying radiant heat in a downward direction and the other radiant energy heating source applying radiant heat in an upward direction.

* * * * *